United States Patent
Gupta

(10) Patent No.: US 9,335,174 B2
(45) Date of Patent: *May 10, 2016

(54) APPLYING AN INDICATION OF A LIKELIHOOD OF A DIRECTIONAL TRANSITION AT A JUNCTION IN AN ENCODED ROUTABILITY GRAPH DESCRIPTION TO A POSITIONING FUNCTION OF A MOBILE DEVICE

(71) Applicant: QUALCOMM Incorporated, San Diego, CA (US)

(72) Inventor: Rajarshi Gupta, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/208,872

(22) Filed: Mar. 13, 2014

(65) Prior Publication Data
US 2014/0195157 A1 Jul. 10, 2014

Related U.S. Application Data

(63) Continuation of application No. 13/309,304, filed on Dec. 1, 2011, now Pat. No. 8,706,413.

(60) Provisional application No. 61/548,165, filed on Oct. 17, 2011.

(51) Int. Cl.
*G01C 21/20* (2006.01)

(52) U.S. Cl.
CPC .................... *G01C 21/206* (2013.01)

(58) Field of Classification Search
CPC .............................. G01C 21/20; G01C 21/206
USPC .......... 701/400, 408, 433, 468–471, 522, 533
See application file for complete search history.

(56) References Cited

U.S. PATENT DOCUMENTS 6,633,812 B1    10/2003   Martin et al.
7,133,771 B1 *  11/2006   Nesbitt ............. G01C 21/3453
                                                    340/995.19

(Continued)

FOREIGN PATENT DOCUMENTS

CN      1924524 A     3/2007
EP      2148169 A2    1/2010

(Continued)

OTHER PUBLICATIONS

Bierlaire, "Route choice with smartphones GPS data," transp-or.epfl. ch, Transport and Mobility Laboratory, Ecole Polytechnique Federale De Lausanne (EPFL), Document Created Oct. 27, 2010, pp. 1-23.

(Continued)

*Primary Examiner* — Mary Cheung
*Assistant Examiner* — Atul Trivedi
(74) *Attorney, Agent, or Firm* — Berkeley Law & Technology Group, LLP

(57) ABSTRACT

Techniques are provided for a mobile, which may be implemented in various methods, apparatuses, and/or articles of manufacture to obtain an encoded routability graph representative of feasible paths for an indoor environment, along with values indicative of likelihoods of transition at certain junctions identifiable in the encoded routability graph, and determine one or both of an estimated position or an estimated direction of travel of the mobile device.

20 Claims, 5 Drawing Sheets

(56) References Cited

U.S. PATENT DOCUMENTS

| | | | |
|---|---|---|---|
| 7,610,151 B2* | 10/2009 | Letchner | G01C 21/3484 701/424 |
| 7,812,766 B2 | 10/2010 | Leblanc et al. | |
| 8,135,539 B2 | 3/2012 | Nesbitt | |
| 8,332,146 B2* | 12/2012 | Rosing | G01C 21/165 701/468 |
| 8,612,134 B2* | 12/2013 | Zheng | G01S 19/14 701/400 |
| 8,779,941 B2* | 7/2014 | Amir | G01C 21/3685 340/932.2 |
| 8,838,376 B2* | 9/2014 | Garin | G01C 21/206 701/409 |
| 2002/0049522 A1* | 4/2002 | Ruffner | A01B 69/008 701/23 |
| 2002/0059025 A1 | 5/2002 | Kim et al. | |
| 2006/0247849 A1 | 11/2006 | Mohsini et al. | |
| 2007/0219708 A1 | 9/2007 | Brasche et al. | |
| 2007/0220522 A1* | 9/2007 | Coene | G06F 9/5066 718/104 |
| 2007/0276709 A1 | 11/2007 | Trimby et al. | |
| 2008/0229415 A1 | 9/2008 | Kapoor et al. | |
| 2008/0312819 A1* | 12/2008 | Banerjee | G01C 21/20 701/433 |
| 2009/0105934 A1 | 4/2009 | Tajima et al. | |
| 2009/0216438 A1* | 8/2009 | Shafer | G01C 21/206 701/414 |
| 2009/0292460 A1 | 11/2009 | Kaldewey et al. | |
| 2009/0292465 A1* | 11/2009 | Kaldewey | G01C 21/00 701/533 |
| 2010/0036606 A1* | 2/2010 | Jones | G01C 21/3446 701/533 |
| 2010/0057354 A1 | 3/2010 | Chen et al. | |
| 2010/0211308 A1* | 8/2010 | Zheng et al. | 701/201 |
| 2010/0228476 A1 | 9/2010 | Bar-Zeev et al. | |
| 2010/0235088 A1* | 9/2010 | Li | G05D 1/0214 701/533 |
| 2010/0253542 A1* | 10/2010 | Seder | G01S 7/22 340/932.2 |
| 2010/0268460 A1* | 10/2010 | Wan | G01C 21/3461 701/414 |
| 2010/0312386 A1 | 12/2010 | Chrysanthakopoulos et al. | |
| 2010/0332373 A1* | 12/2010 | Crabtree | G05Q 50/06 705/37 |
| 2011/0082638 A1 | 4/2011 | Khorashadi et al. | |
| 2011/0112756 A1* | 5/2011 | Winkler | G01C 21/3647 701/533 |
| 2011/0137549 A1* | 6/2011 | Gupta | G01C 21/20 701/533 |
| 2011/0172906 A1* | 7/2011 | Das | G01C 21/20 701/533 |
| 2011/0172916 A1* | 7/2011 | Pakzad | G01C 21/14 701/533 |
| 2011/0178705 A1* | 7/2011 | Pakzad | G01C 21/20 701/533 |
| 2011/0257883 A1* | 10/2011 | Kuznetsov | G01C 21/3691 701/533 |
| 2011/0276266 A1* | 11/2011 | Ballew | G01C 21/206 701/533 |
| 2011/0288762 A1* | 11/2011 | Kuznetsov | G01C 21/32 701/532 |
| 2012/0283948 A1* | 11/2012 | Demiryurek | G01C 21/3492 701/533 |
| 2013/0096885 A1 | 4/2013 | Gupta | |

FOREIGN PATENT DOCUMENTS

| | | |
|---|---|---|
| JP | 2005284588 A | 10/2005 |
| JP | 2006284254 A | 10/2006 |
| WO | WO-2010091033 A1 | 8/2010 |
| WO | WO-2010143730 A1 | 12/2010 |
| WO | WO-2011041745 A1 | 4/2011 |
| WO | WO-2011072169 A2 | 6/2011 |

OTHER PUBLICATIONS

International Search Report—PCT/US2012/054604—ISA/EPO—Apr. 2, 2013.

Mihajlovic, V., et al., "Dynamic Bayesian Networks: A State of the Art", Electrical Engineering, Mathematics and Computer Science (EEMCS), 2001, XP002690503, pp. 1-37, [retrieved on Jan. 16, 2013].

Nizetic, I., et al., "A prototype for the short-term prediction of moving object's movement using markov chains", proceedings of the ITI, Jun. 25, 2009, XP002690504, pp. 559-564, [retrieved on Jan. 16, 2013].

Ray et al., "A continuous-based model for the analysis of indoor spaces", Conference on Spatial Information Theory (COSIT 2009), Sep. 21, 2009, XP002690502, [retrieved on Jan. 11, 2013].

Li X., et al., "Applying GIS to Video Surveillance in Indoor Space," Journal of Remote Sensing, Sep. 2008, vol. 12, No. 5, pp. 819-824.

* cited by examiner

APPLYING AN INDICATION OF A LIKELIHOOD OF A DIRECTIONAL TRANSITION AT A JUNCTION IN AN ENCODED ROUTABILITY GRAPH DESCRIPTION TO A POSITIONING FUNCTION OF A MOBILE DEVICE

CROSS-REFERENCE TO RELATED APPLICATIONS

This application is a Continuation of U.S. patent application Ser. No. 13/309,304, filed Dec. 1, 2011, entitled, "DETERMINING A LIKELIHOOD OF DIRECTIONAL TRANSITION AT A JUNCTION IN AN ENCODED ROUTABILITY GRAPH DESCRIPTION", which claims the benefit of U.S. Provisional Application No. 61/548,165, filed Oct. 17, 2011, entitled, "DETERMINING A LIKELIHOOD OF DIRECTIONAL TRANSITIONS FOR AN ENCODED ROUTEABILITY GRAPH DESCRIPTION", both of which are assigned to the assignee hereof and which are incorporated herein by reference.

BACKGROUND

1. Field

The subject matter disclosed herein relates to electronic devices, and more particularly to methods, apparatuses and articles of manufacture for use in determining one or more likelihoods of transition for an encoded routability graph description for use with an encoded map pertaining to at least a portion of a structure.

2. Information

The Global Positioning System (GPS) represents one type of Global Navigation Satellite System (GNSS), which along with other types of satellite positioning systems (SPS) provide or otherwise support signal-based position location capabilities (e.g., positioning functions) in mobile devices, and particularly in outdoor environments. However, since some satellite signals may not be reliably received and/or acquired by a mobile device within an indoor environment or other like mixed indoor/outdoor environments, different techniques may be employed to enable position location services.

For example, mobile devices may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

These and other like position location and/or navigation techniques tend to be of further benefit to a user if presented with certain mapped features. For example, mapped features may relate to or otherwise identify certain physical objects, characteristics, or points of interest within a building or complex, etc. Thus, in certain instances, an indoor positioning/navigation system may provide an encoded map to mobile device upon entering a particular indoor area. Such a map may show indoor features such as doors, hallways, entry ways, walls, etc., points of interest such as bathrooms, pay phones, room names, stores, etc. Such an encoded map may be stored at a server to be accessible by a mobile device through selection of a URL, for example. By obtaining and displaying such a map, a mobile device may overlay a current location of the mobile device (and user) over the displayed map to provide the user with additional context.

Furthermore, by generating or otherwise obtaining an encoded routability graph relating to an encoded map, a positioning engine or other like capability of a mobile device may be used to navigate within an indoor structure. However, in certain instances an encoded routability graph may be fairly large and/or otherwise computationally complex and hence may burden some mobile devices. Hence there is a continuing desire to reduce size and/or complexity of such encoded files and/or reduce a burden of processing such files.

SUMMARY

In accordance with one aspect, a method may be provided which comprises, at a mobile device, receiving one or more data files comprising an encoded routability graph corresponding to an indoor environment represented by an encoded map, the encoded routability graph being indicative of a plurality of feasible paths within the indoor environment, the plurality of feasible paths being indicated, at least in part, by junctions selectively interconnected by edges. The one or more data files further comprising a plurality of values indicative of likelihoods of transition for at least one of the junctions, the at least one of the junctions being connected to three or more of the edges, wherein the likelihoods of transition are based, at least in part, on one or more features of the encoded map, one or more predetermined possible origination paths in the encoded routability graph leading to the at least one of the junctions via one of the three or more of the edges, and one or more predetermined possible destination paths that lead away from the at least one of the junctions via at least two of the three or more of the edges. The method may further comprise, at the mobile device, determining at least one of an estimated position of the mobile device, or an estimated direction of travel of the mobile device based, at least in part, on at least one of the plurality of values indicative of likelihoods of transition and the encoded routability graph.

In accordance with another aspect, an apparatus may be provided for use in a mobile device. Here, for example, the apparatus may comprise: means for receiving one or more data files comprising: an encoded routability graph corresponding to an indoor environment represented by an encoded map, the encoded routability graph being indicative of a plurality of feasible paths within the indoor environment, the plurality of feasible paths being indicated, at least in part, by junctions selectively interconnected by edges; and a plurality of values indicative of likelihoods of transition for at least one of the junctions, the at least one of the junctions being connected to three or more of the edges, wherein the likelihoods of transition are based, at least in part, on one or more features of the encoded map, one or more predetermined possible origination paths in the encoded routability graph leading to the at least one of the junctions via one of the three or more of the edges, and one or more predetermined possible destination paths that lead away from the at least one of the junctions via at least two of the three or more of the edges. The apparatus may further comprise means for determining at least one of an estimated position of the mobile device, or an estimated direction of travel of the mobile device based, at least in part, on at least one of the plurality of values indicative of likelihoods of transition and the encoded routability graph.

In accordance with yet another aspect, a mobile device may be provided which comprises a communication interface, and a processing unit. Here, for example, the processing unit may: receive one or more data files via the communication interface, the one or more data files comprising: an encoded routability graph corresponding to an indoor environment represented by an encoded map, the encoded routability graph being indicative of a plurality of feasible paths within the indoor environment, the plurality of feasible paths being indicated, at least in part, by junctions selectively interconnected by edges; and a plurality of values indicative of likelihoods of transition for at least one of the junctions, the at least one of the junctions being connected to three or more of the edges, wherein the likelihoods of transition are based, at least in part, on one or more features of the encoded map, one or more predetermined possible origination paths in the encoded routability graph leading to the at least one of the junctions via one of the three or more of the edges, and one or more predetermined possible destination paths that lead away from the at least one of the junctions via at least two of the three or more of the edges. The processing unit may further determine at least one of an estimated position of the mobile device, or an estimated direction of travel of the mobile device based, at least in part, on at least one of the plurality of values indicative of likelihoods of transition and the encoded routability graph.

In accordance with still other aspects, an article of manufacture for use in a computing platform may be provided. The article may comprise a non-transitory computer-readable medium having stored therein computer implementable instructions executable by a processing unit to: receive one or more data files, the one or more data files comprising: an encoded routability graph corresponding to an indoor environment represented by an encoded map, the encoded routability graph being indicative of a plurality of feasible paths within the indoor environment, the plurality of feasible paths being indicated, at least in part, by junctions selectively interconnected by edges; and a plurality of values indicative of likelihoods of transition for at least one of the junctions, the at least one of the junctions being connected to three or more of the edges, wherein the likelihoods of transition are based, at least in part, on one or more features of the encoded map, one or more predetermined possible origination paths in the encoded routability graph leading to the at least one of the junctions via one of the three or more of the edges, and one or more predetermined possible destination paths that lead away from the at least one of the junctions via at least two of the three or more of the edges. The computer implementable instructions may be further executable by the processing unit to determine at least one of an estimated position of the mobile device, or an estimated direction of travel of the mobile device based, at least in part, on at least one of the plurality of values indicative of likelihoods of transition and the encoded routability graph.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
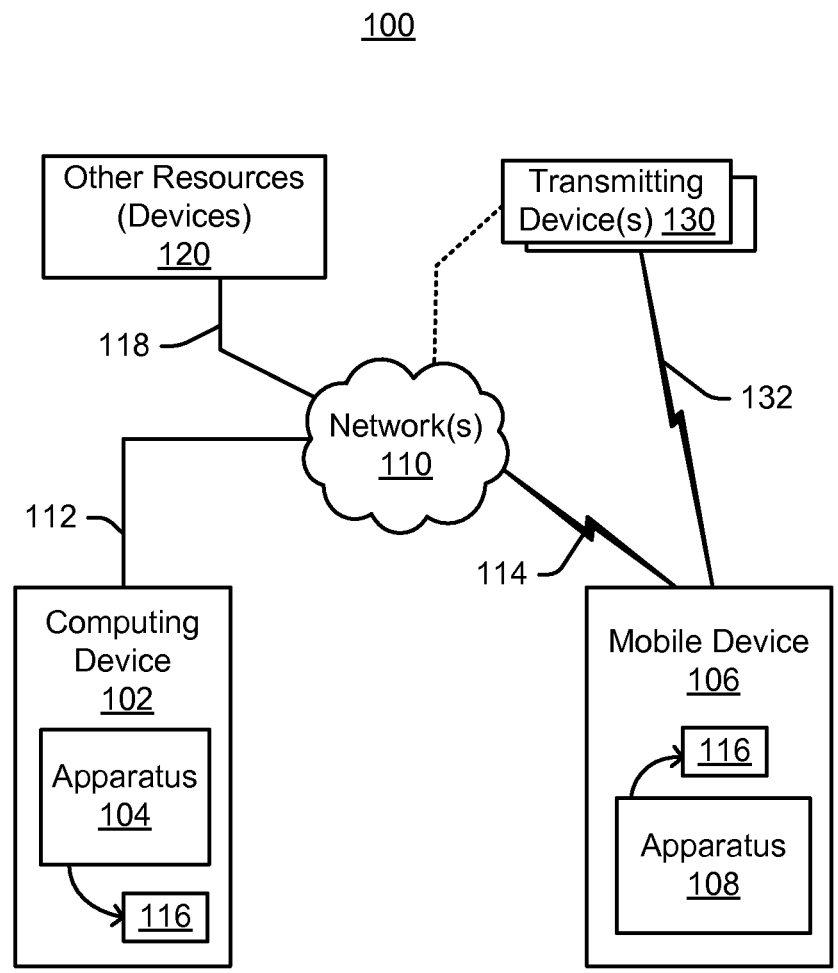
FIG. 1 is a schematic block diagram illustrating a computing and communication environment, in which one or more likelihoods of transition for an encoded routability graph description may be generated, transmitted, stored, and/or otherwise processed, in accordance with an example implementation.

Various techniques are described herein which may be implemented in one or more computing platforms to generate one or more likelihoods of transition for an encoded routability graph description. In certain example instances, generating one or more likelihoods of transition for an encoded routability graph description in advance may reduce a processing burden of a mobile device, and/or possibly improve performance of a mobile device while it is being used to assist a user in navigating an indoor structure.

The use of the term "encoded" herein with respect to various data files and/or instructions files that may be processed in support of the techniques provided herein. An encoded data and/or instruction file may, for example, comprise a plurality of logic values or bits that via one or more coding schemes may be indicative of one or more objects, actions, capabilities, features, and/or the like or some combination thereof relating to some subject. For example, in certain instances, an encoded map may be generated to represent certain modeled and/or real world objects and/or other like features and/or areas of a structure that may appear in a map of a structure and which may be interest to or other affect movement of a user within such a structure. In another example, an encoded routability graph may be generated based, at least in part, on an encoded map to represent certain junctions and interconnecting edges which may relate to certain feasible movements of a user within a particular structure. In certain examples, one or more encoded data and/or instruction files may be further processed to provide data compression, encryption, error-correction, and/or the like or some combination thereof.

An encoded routability graph description may, for example, relate to an encoded map of an indoor structure and indicate paths that a person may follow within the indoor structure. For example, an encoded routability graph description may indicate one or more paths leading from an entry way of an indoor space to one or more rooms or other spaces and/or objects therein. Here, for example, a path may be indicated based on a plurality of interconnected junctions that a person may navigate between. Such a path may, for example, pass through one or more hallways/corridors, one or more doorways, one or more staircases, and/or other like features that may be indicated or otherwise determined from an electronic map (e.g., floor plan, office layout, etc.). However, for example, such a path may not pass through a solid wall, floor, ceiling, desk, and/or some other like object or feature that a person could not or would not usually pass through.

While a simple indoor structure may only comprise one or possibly just a few feasible paths that a person may follow, it should be recognized that certain (e.g., larger or more complex) indoor structures may provide a plethora of feasible paths that a person may follow. With this in mind, as described in greater detail herein, in certain instances it may be beneficial to reduce the number of feasible paths that a person may follow. For example, in certain instances, a reduced version of an encoded routability graph may be employed which may significantly reduce the number of interconnected junctions in a grid or other like pattern of nodes. For example, with an encoded routability graph, a reduced version of an encoded routability graph, and/or the like or some combination thereof, it may be further beneficial to determine certain possible paths that a person may follow from among the feasible paths, e.g., based, at least in part, shortest or other likely routes relating to one or more particular features of the indoor structure, one or more particular points of interest, and/or the like or some combination thereof. Hence, in certain instances, a set of possible paths may represent all or part of a set of feasible paths. Hence, in certain instances, a possible path may transit through a plurality of feasible paths. In other words, a possible path may comprise a string of feasible paths, e.g., extending from one point of interest to another point of interest.

As expected, some paths may pass through the same hallway or doorway before splitting off in different directions. Consequently, a person may change a direction of travel (following one of the paths) at or nearby a particular junction. For example, at one end of a hallway there may be two rooms located on opposite sides of the hallway. Accordingly, a junction may be represented at or nearby the end of the hallway, and which may be connected by edges to respective junctions located in the two rooms. Thus, a user at or nearby the junction in the hallway may follow a particular path along one of the edges into one of the rooms (e.g., by turning left or right at the end of the hallway). In certain instances, a user may also turn-around or otherwise reverse their direction at such a junction to retrace a previous path. In this example, assuming that a person does not terminate their path of travel at or nearby the junction at the end of the hallway, then there are three possible directional transitions, namely, left, right, or turn-back.

It should be recognized that other (non-terminating) junctions may provide for fewer or greater number of possible direction transitions. For example, a simple non-terminating junction may be connected between two other junctions by two edges. Hence, depending on the path, one of the edges may represent an ingress edge and the other may represent an egress edge with respect to that particular junction. For example, one path may follow an ingress edge towards such a particular junction, and an egress edge away from the particular junction. If the person decides to turn-around at or nearby such a particular junction, then such a reversed path may follow an ingress edge towards the particular junction, and the same edge away from the particular junction, in which case the ingress edge has become the egress edge. Thus, a junction may, for example, comprise one or more ingress edges and one or more egress edges, and a (feasible and/or possible) path may follow one or more edges between two junctions.

Thus, as used herein, an edge represents a path that is considered feasible for a user of a mobile device to follow within an indoor environment of a structure from one location corresponding to one junction in an encoded routability graph to another location corresponding to another junction in the encoded routability graph. Hence, depending on a user's direction of travel, an edge may take the form of an ingress edge with respect to a particular junction when it leads towards that particular junction. Conversely, depending on a user's direction of travel, an edge may take the form of an egress edge with respect to a particular junction with it leads away from that particular junction. Of course, in certain instances (e.g. with the user is turning around or reversing their course) and edge a take an initial form of an egress edge only to become an ingress edge.

If two junctions in an encoded routability graph are not connected by an edge, then the lack of such an edge represents a path that is considered infeasible for a user of a mobile device to follow within an indoor environment of the structure associated with the encoded routability graph. Thus, for example, since a user of a mobile device will likely be unable to follow a path through an obstacle such as, e.g., a wall, an associated encoded routability graph would not include an edge between two junctions located on opposite sides of such an obstacle.

As pointed out in greater detail herein, it may be useful to assign likelihoods of transition for one or more edges associated with one or more junctions. For example, it may be useful for a positioning engine in a mobile device to consider one or more values (e.g., directional probabilities, weights, etc.) relating to such likelihoods of transition to estimate a direction of travel of a person (user) carrying or otherwise moving with the mobile device. Hence, for example, a particle filter, Kalman filter, and/or the like of a positioning engine may take into account a probability value or other like metric that a user traveling from one junction to another junction along an ingress edge may or may not transition to a particular egress edge in continuing on their path of travel.

In accordance with certain aspects, one or more likelihoods of transition may, for example, be determined in advance (a priori) based, at least in part, on one or more features of an encoded map. Moreover, all or part of such likelihoods of transition may, for example, be determined by one or more computing platforms located internal and/or external to a mobile device.

For example, as described in greater detail herein, a computing platform may obtain an encoded routability graph that is representative of at least a portion of the feasible paths in an indoor environment represented by an encoded map. The computing platform may, for example, assign likelihoods of transition from an ingress edge in the encoded routability graph to individual egress edges through a junction connecting the ingress edge to the egress edges based, at least in part, on one or more features of the encoded map.

In certain further example implementations, a computing platform may assign likelihoods of transition based, at least in part, on possible origination paths in the encoded routability graph connected to the junction through the ingress edge and possible destination paths connected to the junction through the egress edge. For example, a computing platform may determine at least one likelihood of transition from the ingress edge to one of the egress edges based, at least in part, on a ratio of a number of possible paths through the egress edge leading away from the junction to a number of possible paths through the ingress edge leading toward the junction.

In certain example implementations, possible origination paths and/or possible destination paths may be based, at least in part, on point-to-point connections between nodes in a reduced version of an encoded routability graph. For example, in certain instances a node in a reduced version of an encoded routability graph may be assigned a weight value that is based, at least in part, on a number of encoded connectivity graph nodes represented by the node. For example, in certain instances a node in a reduced version of an encoded routability graph indicative of macro scale feasible paths, may comprise/consume or otherwise represent a plurality of nodes of an encoded connectivity graph which may indicate relatively smaller micro scale feasible paths.

In certain example implementations, possible origination paths and/or possible destination paths may be based, at least in part, on point-to-point connections between nodes representing points of interest in an indoor environment represented by an encoded map along the encoded routability graph. In certain example instances, a node representing at least one point of interest may be assigned a weight value relative to at least one other node representing at least another point of interest. In certain example implementations, a computing platform may determine at least one possible origination path in the encoded routability graph using an all-pairs shortest path (APSP) algorithm.

In certain example implementations, a computing platform may affect at least one weight value assigned to at least one node in an encoded routability graph corresponding to at least one junction.

In certain example implementations, a likelihood of transition may be representative of a possible turn-back transition at a junction in which an ingress edge further represents an egress edge. In certain instances, a likelihood of transition that is representative of a possible turn-back transition may, for example, comprise a predetermined value (e.g., a nominal value, a null value, etc.).

FIG. 1 is a schematic block diagram illustrating a computing and communication environment 100, in which one or more values representing one or more likelihoods of transition 116 for an encoded routability graph description may be generated, transmitted, stored, and/or otherwise processed, in accordance with an example implementation.

Example environment 100 may comprise a computing device 102 having an apparatus 104 for use in generating all or part of likelihoods of transition 116. As described in greater detail below, apparatus 104 may, for example, obtain an encoded routability graph description for an encoded map (e.g., one or more electronic files relating to a floor plan, office layout, CAD drawing, etc.) for a structure that includes an indoor area that may be navigated in some manner by a user of a mobile device 106. Encoded map may, for example, indicate various features that may affect a user's travel within the structure in some manner. For example, certain features may indicate various types of route obstructions present within an indoor area. For example certain features may indicate regions of space that may or may not be traveled by a user. For example, certain features may indicate certain locations, objects, services, etc., that may be of interest at times to one or more users.

An encoded routability graph description may, for example, indicate a set of grid points (e.g., nodes, junctions) that may be assigned to at a portion of an encoded map of an indoor area and which may be interconnected to represent feasible paths that a user may travel. In certain instances, an encoded routability graph description may, for example, indicate a reduced version of an encoded routability graph in which certain grid points have been selectively merged to reduce the set of grid points. Thus, for example, in certain implementations, an encoded routability graph description may comprise selectively merged grid points in which certain neighboring grid points may have absorbed other grid points in light of an absence of route obstructions between the grid point's locations. There are a variety of ways in which a set of interconnected grid points maybe reduced. Accordingly, all of part of a full set and/or some reduced set of grid points may be identified as an encoded routability graph at apparatus 104 for use in generating all or part of likelihoods of transition 116 as described in herein.

As shown, computing device 102 may be connected to one or more wired and/or wireless network(s) 110 via a communication link 112. A mobile device 106 may, for example, be coupled to network(s) 110 via a communication link 114. As such, in certain example implementations, one or more values representing likelihoods of transition 116 may be transmitted or otherwise provided by computing device 102 to mobile device 106. For example, all or part of likelihoods of transition 116 may represent an a priori directional probability value that may be used by a positioning engine in a mobile device to estimate a likely path of travel, etc.

In certain example implementations, mobile device 106 may, for example, comprise an apparatus 108 that may itself generate all or part of all or part of the values representing likelihoods of transition 116. As illustrated herein, one or more computing platforms may be provided in one or more devices to generate all or part of all or part of the values representing likelihoods of transition 116. Apparatus 108 may further or alternatively obtain, store, transmit, and/or otherwise process all or part of the values representing likelihoods of transition 116.

Network(s) 110 may, for example, be further connected to one or more other resources (devices) 120, e.g., via communication link 118. In certain example implementations, computing device 102 and/or mobile device 106 may obtain, from other resources (devices) 120, all or part of one or more encoded maps and/or other like diagrams, and/or one or more encoded routability graphs and/or other like data files, etc., which may be of use in generating or otherwise processing all or part of all or part of the values representing likelihoods of transition 116 for a structure.

In certain example implementations, environment 100 may further comprise one or more transmitting devices 130 which may transmit one or more signals 132 that may be received by a mobile device 106 and used, at least in part, to support signal-based positioning capabilities and/or other like navigation capabilities. By way of example, one or more transmitting devices 130 may be part of, or otherwise support, a Satellite Positioning System (SPS) such as a Global Navigation Satellite System (GNSS), regional positioning/navigation system, etc. In certain examples, one or more transmitting devices 130 may be part of, or otherwise support, a terrestrial-based Location Based Service (LBS) and/or the like, which may be implemented via one or more cellular communication networks, one or more wireless communication networks, one or more dedicated beacon transmitting devices, and/or the like or some combination thereof. In certain instances one or more transmitting devices 130 may provide additional communication services to mobile device 106, it may therefore be coupled to and/or part of network(s) 110. For example one or more transmitting devices 130 may comprise access points within a wireless local area network, etc., e.g. as represented in FIG one by the dashed connecting line between transmitting device(s) 130 and network(s) 110. Consequently, in certain instances, signal 132 may comprise bidirectional wireless communications between a wireless transmitting device 130 and mobile device 106.

As may be appreciated, in certain instances one or more signals 132 from one or more transmitting devices 130 may be acquired by mobile device 106 and used to estimate its position location in some manner. While mobile device 106 is within a structure, in certain instances some of the signals and 32 from some of transmitting devices 130 may not be acquired due to interference and/or other signal propagation factors presented by the various objects that make up the structure, and/or objects within the structure. Hence, for example, in certain structures a mobile device 106 may be unable to adequately acquire SPS signals transmitted by orbiting satellites. However, in certain instances, while within a structure a mobile device 106 may be able to adequately acquire terrestrial-based transmissions that may augment SPS signals, and/or represent signals associated with a location based service and/or the like. Thus for example, while inside certain structures, mobile device 106 may attempt to estimate its position location based on one or more signals 132 obtained from one or more transmitting devices 130, and in certain instances one or more of such transmitting devices 130 may be arranged within the structure and/or about the structure so as to provide adequate coverage within the structure. Such techniques and systems are well known and gaining in popularity.

The term "structure" may, for example, apply to (all or part of) one or more natural and/or man-made physical arrangements of object(s), the knowledge of which may be of use to a user of mobile device 106. For example, a structure may comprise one or more buildings or a portion thereof. A "feature" may, for example, identify an object or obstacle (e.g., a wall, a door, an elevator, a staircase, a statue, etc.), an entity and/or service (e.g., a business, a taxi stand, a restroom, a doctor's office, a lost and found department, a security station, etc.), and/or any other positioning/navigational, location based service characteristic which may be identified via representative data in one or more files of an electronic map. In certain instances, for example, a feature may represent something to navigate around (e.g., such as a route obstacle), navigate towards or through (e.g., a doorway, an elevator, etc.), or possibly navigate away from (e.g., a staircase). Of course these are simply a few examples and, as with all of the examples presented herein, claimed subject matter is not necessarily intended to be so limited.

Figure 2:
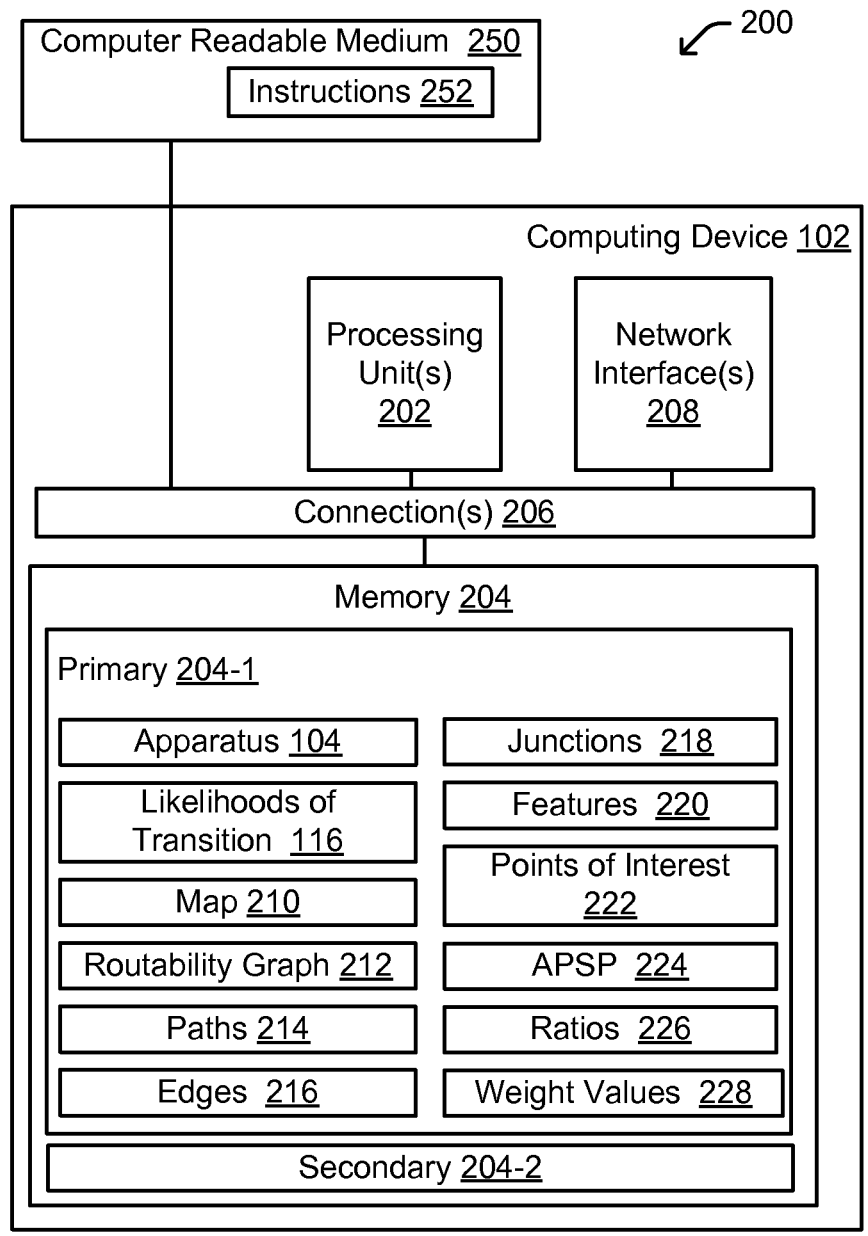
FIG. 2 is a schematic block diagram illustrating certain features of a computing device that may generate one or more likelihoods of transition for an encoded routability graph description, in accordance with an example implementation.

Reference is made next to FIG. 2, which is a schematic block diagram illustrating certain features of a computing device 102, for example as in FIG. 1, in form of a computing platform 200 that may generate one or more values representing one or more likelihoods of transition for an encoded routability graph description, in accordance with an example implementation.

As illustrated computing platform may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 250. Memory 204 and/or computer readable medium 250 may comprise computer-implementable instructions 252 for certain example techniques as provided herein.

As illustrated in FIG. 2, at various times, memory 204 may store certain signals representing data and/or computer-implementable instructions for certain example techniques as provided herein. For example, memory 204 may store data and/or computer-implementable instructions for apparatus 104. By way of example, memory 204 may at various times store representative data for one or more values representing one or more likelihoods of transition 116, one or more encoded maps 210 or portions thereof, all or part of an encoded routability graph description 212, one or more feasible and/or possible paths 214, one or more edges 216, one or more junctions 218, one or more features 220, one or more points of interest 222, an all-pairs shortest path (APSP) algorithm 224 and/or the like, one or more ratios 226, one or more weight values 228, and/or the like or some combination thereof.

As shown, computing device 102 may, for example, comprise a network interface 208. Network interface 208 may, for example, provide a capability to receive and/or transmit wired and/or wireless signals, e.g., to communicate via network(s) 110 (FIG. 1).

In certain example implementations, computing platform 200 may take the form of a server or other like device. In certain example implementations, computing platform 200 may take the form of a wireless network element, or other location based service element. In certain example implementations, computing platform 200 may take the form of a portion of a cloud computing configuration. In certain example implementations, computing platform 200 may take the form of a wireless access point or other like local area network computing resource.

Figure 3:
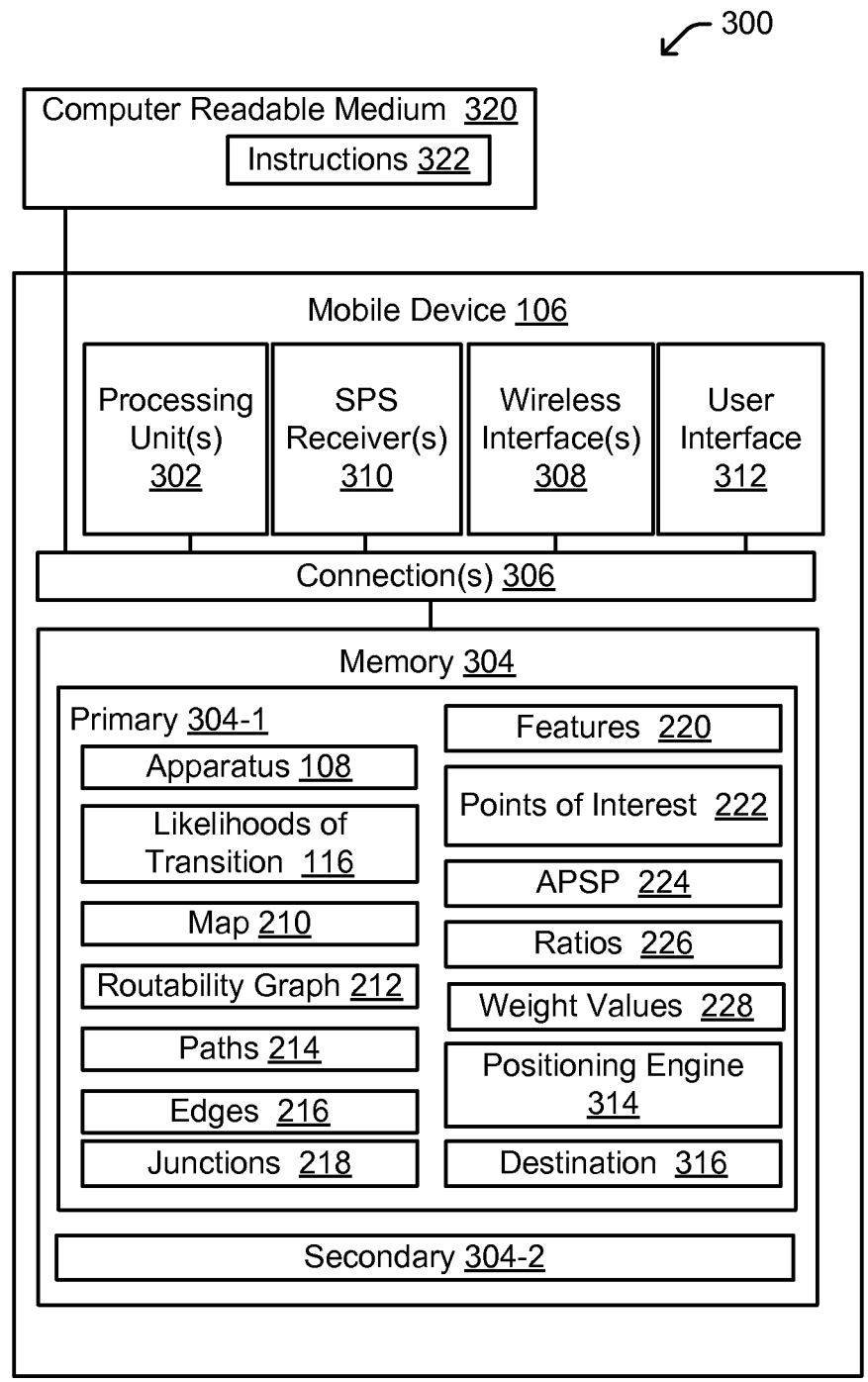
FIG. 3 is a schematic block diagram illustrating certain features of a mobile device that may generate or otherwise obtain one or more likelihoods of transition for an encoded routability graph description, in accordance with an example implementation.

Reference is made next to FIG. 3, which is a schematic block diagram illustrating certain features of a mobile device 106, e.g., as in FIG. 1, in the form of a computing platform 300 that may generate or otherwise obtain one or more values representing one or more likelihoods of transition for an encoded routability graph description, in accordance with an example implementation.

As illustrated, computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 106. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 320. Memory 304 and/or computer readable medium 320 may comprise computer-implementable instructions 322 for certain example techniques as provided herein.

As illustrated in FIG. 3, at various times, memory 304 may store certain signals representing data and/or computer-implementable instructions for certain example techniques as provided herein. For example, memory 304 may store data and/or computer-implementable instructions for apparatus 108. By way of example, memory 304 may at various times store representative data for one or more values representing one or more likelihoods of transition 116, one or more encoded maps 210 or portions thereof, all or part of an encoded routability graph description 212, one or more feasible and/or possible paths 214, one or more edges 216, one or more junctions 218, one or more features 220, one or more points of interest 222, an all-pairs shortest path (APSP) algorithm 224 and/or the like, one or more ratios 226, one or more weight values 228, a positioning engine 314, one or more estimated destinations 316, and/or the like or some combination thereof.

As shown, mobile device 106 may, for example, comprise a wireless interface 308. Wireless interface 308 may, for example, provide a capability to receive and/or transmit wired and/or wireless signals, e.g., to communicate via network(s) 110, and/or one or more transmitter devices 130 (FIG. 1). Wireless interface 308 may be comprised of one or more interfaces possibly including but not limited to interfaces for wide area networks (WAN) such as GSM, UMTS, CDMA, LTE, WCDMA and CDMA 2000 and interfaces for personal area networks (PAN) such as WiFi and Bluetooth. It is also understood that there may be multiple wireless interfaces 308 that may be used simultaneously or individually. Wireless interface 308, may in certain implementations also concurrently and/or alternatively act as a receiver device (and/or transceiver device) to acquire signals 132 (FIG. 1) from one or more transmitting devices 130 for use in position location and/or other positioning/navigation services, e.g. that may be supported by terrestrial locating services, such as e.g., one or more LBS which may be provided, at least in part, by a cellular network, a WiFi network, etc. In certain example implementations, wireless interface 308 may also be representative of one or more wired network interfaces.

As shown, mobile device 106 may, for example, may comprise a SPS receiver 310, which may provide position location and/or other navigation services based on certain signals 132 transmitted by one or more transmitting devices 130. For example, SPS receiver 310 may comprise an SPS receiver capable of receiving and processing one or more GNSS, or other like satellite and/or terrestrial location systems. The SPS receiver 310 may be used for various purposes such as for positioning/navigation of the mobile device and for location based services (LBS), such as, e.g., one or more LBS which may be provided, at least in part, by a cellular network, a WiFi network, etc. SPS receiver 310 may operatively provide location information and/or otherwise operate in some manner with positioning engine 314. In certain instances, all or part of positioning engine 314 may be provided by SPS receiver 310.

As shown, mobile device 106 may comprise one or more user interfaces 312. For example user interface 312 may be representative of one or more user input and/or user output devices. Thus, for example, user interface 312 may comprise a keypad, a touch screen, various buttons, various indicators, a display screen, a speaker, a microphone, a projector, a camera, etc.

Mobile device 106 is representative of any electronic device that may be moved about within environment 100. For example, mobile device 106 may comprise a hand-held computing and/or communication device, such as, a mobile telephone, a smart phone, a lap top computer, a tablet computer, a positioning/navigation device, and/or the like. In certain example implementations, mobile device 106 may be part of a circuit board, an electronic chip, etc.

It should be understood that mobile device 106 may also or alternatively comprise one or more other circuits, mechanisms, etc., (not shown) that may be of use in performing one or more other functions or capabilities, and/or supportive of certain example techniques as provided herein.

Computing device 102 and/or mobile device 106 may, for example, be enabled (e.g., via one or more network interfaces 208, one or more wireless interfaces 308, etc.) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

An encoded map of an indoor space may, for example, be derived from a CAD or other like drawing or file. Thus, a CAD drawing may show rooms and hallways formed by walls, doorways, etc., and/or other objects, or points of interest. Once the CAD drawing is transformed to a particular format usable as a digital map, the digital map may be electronically stored for access by various computing platforms as discussed above.

In one particular implementation, an encoded routability graph may comprise or may be based on a set of grid of points which may be virtually projected over an area covered by a map of an indoor area such as a floor of an office building, shopping mall, school building, etc. Neighboring (adjacent) grid points may then be selectively connected by edges subject to features in the map to indicate possible direct transitions between locations of the neighboring points without obstruction (e.g., walls). Thus, for example, interconnected grid points may form "nodes" in an encoded routability graph for use in modeling movement of a mobile device in the indoor area. One or more of the nodes may, for example, represent a junction or be represented by a junction.

In particular implementations, a location of a mobile device may be modeled as being placed at points along edges connecting neighboring nodes in the encoded routability graph described above. Likewise, transitions from an initial position to a subsequent position may be modeled to occur along edges of the encoded routability graph. In addition, a likelihood model may further characterize possible transitions of a mobile device from an initial position to a subsequent position over a time period. In a particular example, a Kalman or particle filtering model and/or the like may establish a likelihood that a mobile device have a particular subsequent location, velocity and heading that is conditioned on an initial location, velocity and heading.

To provide sufficient granularity in certain example encoded routability graph descriptions, grid points may be projected over an indoor area densely so that an encoded routability graph may be sufficiently granular to support particular applications. However, determining an encoded routability graph and/or transition probabilities for a dense population of grid points may be computationally intensive. Likewise, executing mobile applications to perform routing, particle filtering, etc., processing resources of a mobile device may be taxed by computing/evaluating detailed routes and/or a large number/high density of particles using particle filtering techniques. As such, it may be useful to reduce the number of nodes or junctions in an encoded routability graph, e.g., to provide sufficient granularity in encoded routability graphs and/or density of particles without over taxing processing resources. Thus, in certain example instances, possible paths may be determined using a reduced encoded routability graph description.

Figure 4:
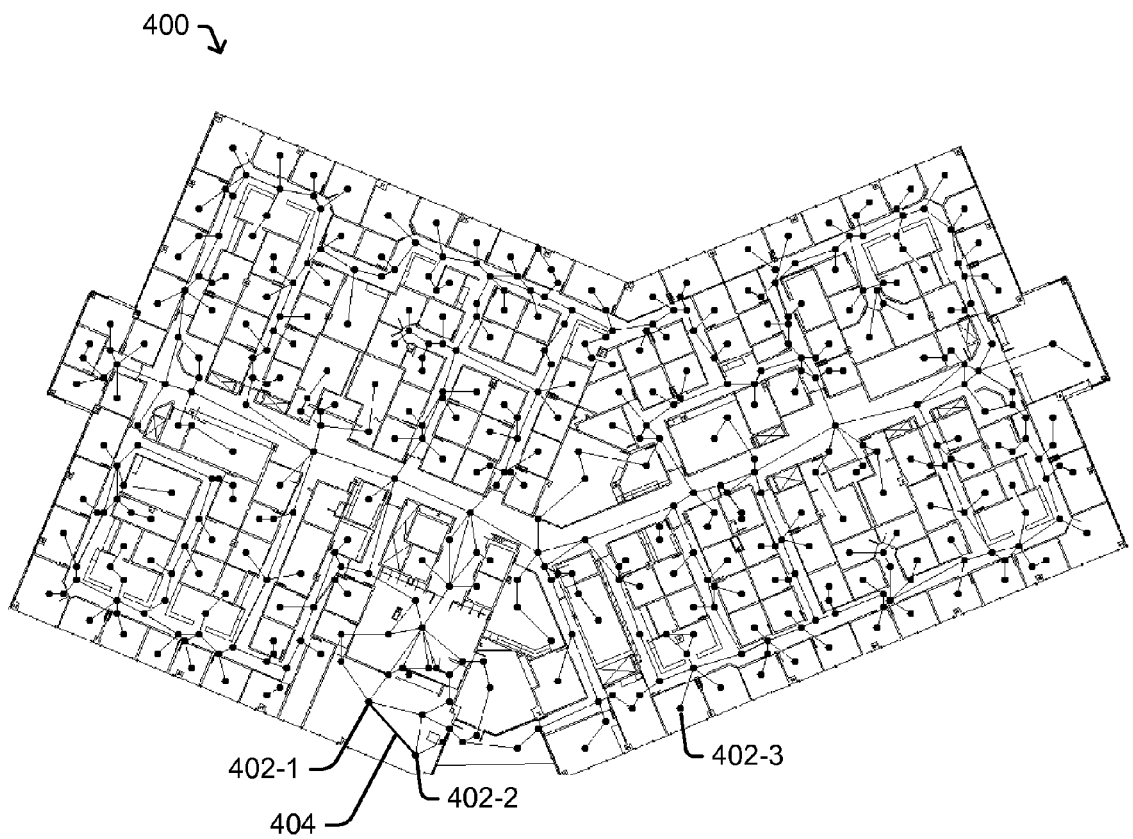
FIG. 4 is an illustrative diagram showing a reduced set of junctions in a diagram of a floor of a v-shaped office, in accordance with an example implementation.

Reference is made next to FIG. 4, which is an illustrative diagram showing a reduced set of junctions in a diagram of a floor plan of a v-shaped office building 400, which depicts various features as may be found in encoded map. For example, building 400 comprises a plurality of office spaces interconnected via hallways, etc.

An encoded routability graph is further illustrated in FIG. 4 by a plurality of nodes 402 that are dispersed about the floor plan. For example, a node 402-1 and a node 402-2 are shown as being interconnected by an edge 404. As can be seen, some nodes (e.g., node 402-3) have one edge which renders them terminating nodes, while other nodes (e.g., node 402-1) have two or more edges which renders them non-terminating nodes.

A path of travel through or within building 400 may, for example, generally follow some subset of the point-to-point connections illustrated by applicable nodes and edges. As may be appreciated, certain nodes or junctions may be related (e.g., co-located, adjacent, nearby, etc.) to one or more points of interest. For example, a break room or meeting room, or possibly bathroom, may be of interest to the user and hence represents a point of interest. Further, building entrances and/or exits may also represent points of interest. Hence, some possible paths may lead to one or more particular points of interest. It should be noted, that the encoded routability graph illustrated in the example in FIG. 4 represents a reduced version of an encoded routability graph, in accordance with an implementation. Clearly, other encoded routability graphs may be used; for example, an encoded routability graph may include additional nodes or junctions aligned with other grid points, etc. Further, it should be noted that users typically take shorter routes to certain points of interest or other destinations. Of course, some users may get lost or run into detours which cause them to take longer paths. As described herein a set of feasible paths may be reduced to a set of possible paths in some manner, e.g., considering points of interest, considering shortest paths, etc. Hence, if the user does happen to take the shortest path, then the determined likelihoods of transition may prove useful in a positioning engine that may be supporting our tracking user movements.

Figure 5:
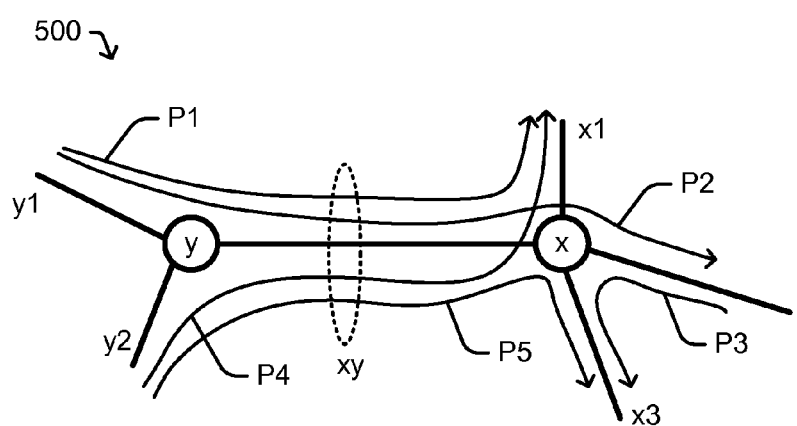
FIG. 5 is an illustrative diagram showing two junctions in the form of nodes that are connected together and a plurality of ingress and egress edges, along with a plurality of possible paths corresponding thereto, in accordance with an example implementation.

FIG. 5 is an illustrative diagram showing a portion 500 of an encoded routability graph comprising two junctions (labeled x and y) in the form of nodes that are connected together and a plurality of ingress and egress edges, along with a plurality of possible paths corresponding thereto, in accordance with an example implementation.

As shown, junctions y and x are connected by an edge labeled xy. In this example, several possible paths are shown which follow edge xy from junction y to junction x, and one path is shown which does not follow edge xy. In this example, junction y has two edges, y1 and y2, which act as ingress edges with regard to junction y and paths P1 and P2, and paths P4 and P5, respectively. Junction x, in this example, has three edges, labeled x1, x2 and x3, each of which represents an egress edge with respect to at least one of the example paths. For example, path P1 follows ingress edge y1 to junction y, edge xy to junction x, and exits via egress edge x1. Example path P2 follows ingress edge y1 to junction y, edge xy to junction x, and exits via egress edge x2. Path P4, for example, follows ingress edge y2 two junction y, edge xy to junction x, and exits via egress edge x1. Example path P5 follows ingress edge y1 to junction y, edge xy to junction x, and exits via egress edge x3. Example path P3 follows edge x2 (as an ingress edge) to junction x, and exits junction x via egress edge x3. Hence, example path P3 does not follow edge xy.

As mentioned in certain implementations, possible paths flowing through an edge to a destination may be identified or determined based upon an identification of point-to-point connections of nodes in a reduced version of an encoded routability graph flowing through the edge. In certain other implementations, possible paths flowing through an edge may be identified or determined based upon point-to-point connection of points of interests (POIs) such as specific rooms or areas in an indoor environment represented by an encoded map.

It should be understood that given multiple choices of direction from a junction and the various possible paths that a user may follow, it is unlikely that each of the directions will have the same likelihood (e.g., probability value) of transition. Accordingly, analysis of encoded map features may determine a priori probabilities for each direction. Such probabilities may, for example, depend on the destinations in each direction. It should be kept in mind, however, while such directional probabilities may not be applicable at a micro scale (e.g., an encoded connectivity graph) scale, they may be applicable at a macro scale (e.g., an encoded routability graph, reduced version of an encoded routability graph, etc.) in which possible paths to one or more destination are part of the macro scale graph.

As pointed out herein, directional probabilities may be used to provide hints to a positioning engine about an expected next-macro-hop destination for a user. For example, at a mobile device having a positioning engine that uses a particle filter and/or the like, may operate more efficiently with a priori probability values of where the mobile device is likely to be headed at a macro scale.

In certain example implementations, one may let a flow designate a path from one node to another, and provide each node with a weight that may comprise flows that start at that specific node and flows that pass through that specific node. Thus, for example, each node will have incoming flows from all its neighbors and flows that start at the particular node. Such flows may be split between the edges to its neighbor nodes and which terminate at the particular node itself. Accordingly, a ratio in which the flows are split may correspond to a directional probability value of paths with regard to the egress edges from the particular node.

In this example, let: XY represent a set of all paths from nodes of an encoded routability graph flowing through junction x; X1 represent a subset of paths in xy flowing through junction x to egress edge x1; X2 represent a subset of paths in xy flowing through junction x to egress edge x2; and, X3 represent a subset of paths in xy flowing through junction x to egress edge x3. Note that path P3, as previously mentioned, does not flow through xy.

Accordingly, as described in further detail below, one or more values representing one or more likelihoods of transition from ingress edge xy through junction x to egress edges x1, x2 and x3 may be estimated as follows (e.g., in the form of a probability value):

$$P_{xy \to x1} = N(X1)/N(XY);$$

$$P_{xy \to x2} = N(X2)/N(XY); \text{ and}$$

$$P_{xy \to x3} = N(X3)/N(XY),$$

where $N(\xi)$ represents the cardinality of (or count of elements in) set $\xi$.

Thus, for example, given that the user travels from junction y to junction x, one may calculate a probability that the user will depart junction x on egress edges x1, x2, and x3. Such calculation may, for example, result in one or more values representing a likelihood of transition for each of these edges. For example in portion 500 of FIG. 5, there are four flows (P1, P2, P4, P5) on edge xy, and two of those flows (P1, P4) continue on egress edge x1, one of those flows (P2) continues on egress edge x2, and one of those flows (P5) continues on egress edge x3. Hence, for example, a probability that a user will depart junction x on egress edge x1 may be 50% because two flows out of the four flows continue on egress edge x1; a probability that a user will depart junction x on egress edge x2 may be 25% because one flow out of the four flows continues on egress edge x2; and a probability that a user will depart junction x on egress edge x3 may be 25% because one flow out of the four flows continues on egress edge x3. Again, such example probabilities may be determined based on a ratio of a number of possible paths through the egress edge leading away from the junction to a number of possible paths through the ingress edge leading toward the junction. As previously mentioned, in certain instances a value representing a likelihood of transition may, for example, be added to, or otherwise used in some manner to affect a change in, a weight that may be assigned to a node or junction. Each path (e.g. P1, P2, P3) may also have a weight representing how often the path itself is used. These weights may be used, for example, to calculate the transition probabilities as described above.

Additionally, in certain implementations it may be beneficial to include a value representing a likelihood of transition for a user who decides to turn around or reverse their direction travel at or near a junction. Thus for example, in certain instances a nominal value (e.g., predetermined, dynamically determined, etc.) may be used to represent such a likelihood. Thus, in the previous example it may be beneficial to assign a turnaround probability of 5%, which may slightly reduce the other probabilities accordingly.

In certain example implementations, various methods may be used to determine possible paths with regard to an encoded routability graph. For example, in certain implementations an APSP algorithm and/or the like may be run from each node on a reduced version of an encoded routability graph. After each APSP, and for each edge xy in the SP one may, for example: increment a counter xy; increment one of the counters y1, y2, e.g., depending on a source of a path; and increment one of the counters x1, x2, x3, e.g., depending on a destination of a path. E In certain example implementations, it may be that each node or junction in the reduced version of an encoded routability graph may have a corresponding weight w that represents a number of an encoded connectivity graph grid points or nodes absorbed into it and/or which it otherwise represents. Here for example, the counters may be incremented or otherwise affected in some manner based, at least in part, on a weight w of the node or junction.

Figure 6:
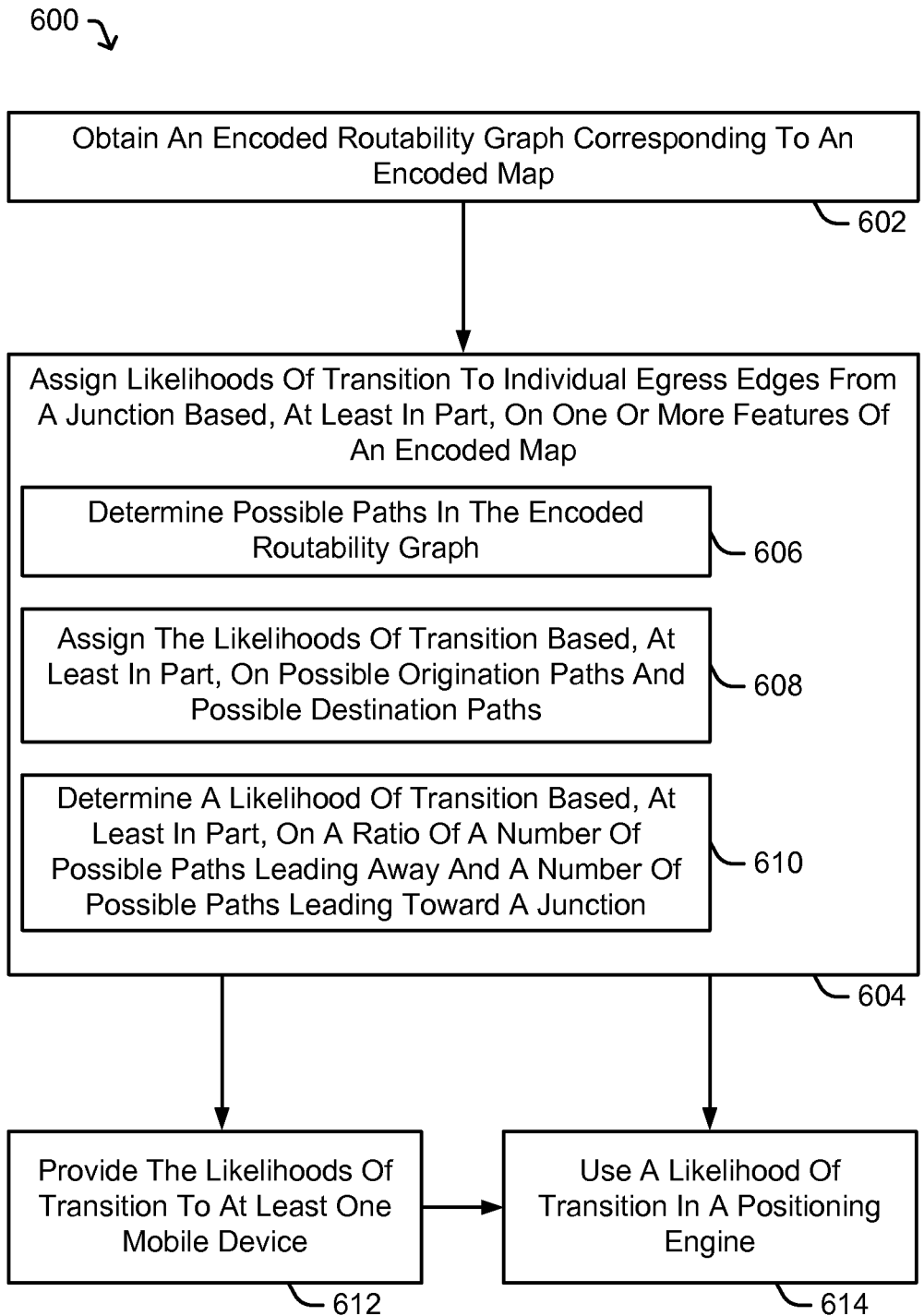
FIG. 6 is a flow diagram illustrating an example method that may be implemented in whole or part in with a computing device and/or with a mobile device to generate one or more likelihoods of transition for an encoded routability graph description, in accordance with an implementation.

Attention is drawn next to FIG. 6, which is a flow diagram illustrating an example process or method that may be implemented in whole or part in one or more computing platforms to generate one or more values representing one or more likelihoods of transition for an encoded routability graph description, in accordance with an implementation.

At example block 602, an encoded routability graph description may be obtained. For example, an encoded routability graph description may be obtained from one or more other devices 120 (FIG. 1), and/or otherwise determined using known techniques. In certain instances, an encoded routability graph description may comprise a reduced version of an encoded routability graph. An encoded routability graph description may, for example, relate to all or part of an encoded map for all or part of a structure comprising an indoor space. As previously mentioned, and encoded routability graph description may specify a plurality of junctions which are interconnected in some manner by edges. Additionally, one or more of the junctions may correspond to one or more particular features, points of interest, etc. that may be included in or otherwise derived from an encoded routability graph description. As used herein, for simplicity the phrase "encoded routability graph description" may simply be referred to as an encoded routability graph and/or a reduced version of an encoded routability graph. Also, the terms node and junction may be used interchangeably.

At example block 604, one or more values representing one or more likelihoods of transition may be assigned to individual egress edges from a junction based, at least in part, on one or more features of an encoded map. In certain example implementations, possible paths in the encoded routability graph may be determined, e.g. at block 606. At block 608, one or more values representing one or more likelihoods of transition may be assigned based, at least in part, on possible origination paths and/or possible destination paths. At block 610, one or more values representing one or more likelihoods of transition may be based, at least in part, on a ratio of a number of possible paths leading away from a junction and a number of possible paths leading towards a junction.

At example block 612, in certain instances one or more values representing one or more likelihoods of transition may be transmitted or otherwise provided to one or more mobile devices. Here, for example, computing device 102 may transmit one or more values representing one or more likelihoods of transition, as shown in block 612, to mobile device 106, via network(s) 110 (FIG. 1).

At example block 614, a mobile device may use one or more values representing one or more likelihoods of transition in one or more functions. For example, a mobile device may use one or more values representing one or more likelihoods of transition in a positioning engine or other like positioning or navigation capability. For example, in certain implementations a positioning engine may comprise a particle filter and/or the like which may use one or more values representing one or more likelihoods of transition to possibly help predict or otherwise estimate a direction of travel and/or potential destination of a user with regard to a possible path, an encoded routability graph, a point of interest, and/or other feature(s) of an encoded map.

It should be recognized from the examples provided herein that a mobile device having knowledge of one or more a priori directional probability values may improve performance. Further, as pointed out in some of the examples herein users may not simply move from node to node in an encoded routability graph but rather users tend to move on paths from and/or to certain points of interest and/or other like features that may be identifiable in advance from an encoded map and/or other like encoded files. By considering the shortest paths between such features and/or points of interests using an encoded routability graph, one may determine a likelihood of transition and provide such information to a positioning engine for consideration when estimating a direction of travel and/or some destination. Thus, for example, one may define a set of points of interests and/or various classes of points of interest and their locations in an encoded routability graph, and consider the possible (e.g., shortest) paths on such routability graph which lead to or from one or more points of interest. For example, if possible path may lead from an office to an exit or from a meeting room to a bathroom, etc. As mentioned, in certain instances it may be beneficial to assign a weight value to such nodes or junctions, and/or edges, which may then represent, or be used to determine, a value representing a likelihood of transition. For example, a weight value may be used to calculate a directional probability value, e.g., as previously shown. If other weights are used in an encoded routability graph then in certain instances, it may be possible to combine the weight values of the present techniques with other weights to further estimate a likelihood of transition for a given note or junction. For example, if a node or junction has a weight w that is indicative of a number of nodes or grid points that it represents, then it may be possible and beneficial to combine or otherwise take into account the weight w with a corresponding weight value relating to a likelihood of transition calculation.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information (e.g., as representative data). It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
receiving one or more data files comprising:
an encoded routability graph corresponding to an indoor environment represented by an encoded map, said encoded routability graph being indicative of a plurality of feasible paths within said indoor environment, said plurality of feasible paths being indicated, at least in part, by junctions selectively interconnected by edges, and
a plurality of values indicative of likelihoods of transition for said edges, at least one of said junctions being connected to three or more of said edges, wherein said values indicative of likelihoods of transition are based, at least in part, on one or more features of said encoded map, a number of predetermined possible origination paths in said encoded routability graph leading to said at least one of said junctions, and a number of predetermined possible destination paths that lead away from said at least one of said junctions; and
determining an estimated position of said mobile device or an estimated direction of travel of said mobile device, or a combination thereof, based, at least in part, on at least one of said plurality of values indicative of likelihoods of transition and said encoded routability graph.

2. The method of claim 1, wherein said values indicative of likelihoods of transition are based, at least in part, on, a ratio indicative of: said number of predetermined possible destination paths leading away from said at least one of said junctions; and said number of predetermined possible origination paths leading toward said at least one of said junctions.

3. The method of claim 1, wherein said number of predetermined possible origination paths and said number of predetermined possible destination paths are based, at least in part, on one or more points of interest in said encoded map.

4. The method of claim 1, wherein at least one of said number of predetermined possible origination paths is based, at least in part, on an all-pairs shortest path (APSP) algorithm applied to said encoded routability graph.

5. The method of claim 1, wherein determining at least one of said estimated position of said mobile device, or said estimated direction of travel of said mobile device, further comprises:
affecting a particle filter based, at least in part, on said at least one of said plurality of values indicative of likelihoods of transition.

6. The method of claim 1, wherein at least one of said plurality of values indicative of likelihoods of transition indicates a probability value.

7. An apparatus for use in a mobile device, the apparatus comprising:
means for receiving one or more data files comprising:
an encoded routability graph corresponding to an indoor environment represented by an encoded map, said encoded routability graph being indicative of a plurality of feasible paths within said indoor environment, said plurality of feasible paths being indicated, at least in part, by junctions selectively interconnected by edges, and
a plurality of values indicative of likelihoods of transition for said edges, at least one of said junctions being connected to three or more of said edges, wherein said values indicative of likelihoods of transition are based, at least in part, on one or more features of said encoded map, a number of predetermined possible origination paths in said encoded routability graph leading to said at least one of said junctions and a number of predetermined possible destination paths that lead away from said at least one of said junctions; and
means for determining an estimated position of said mobile device or an estimated direction of travel of said mobile device, or a combination thereof, based, at least in part, on at least one of said plurality of values indicative of likelihoods of transition and said encoded routability graph.

8. The apparatus of claim 7, wherein said values indicative of likelihoods of transition are based, at least in part, on, a ratio indicative of: said number of predetermined possible destination paths leading away from said at least one of said junctions; and said number of predetermined possible origination paths leading toward said at least one of said junctions.

9. The apparatus of claim 7, wherein said number of predetermined possible origination paths and said number of predetermined possible destination paths are based, at least in part, on one or more points of interest in said encoded map.

10. The apparatus of claim 7, wherein at least one of said one or more predetermined possible origination paths is based, at least in part, on an all-pairs shortest path (APSP) algorithm applied to said encoded routability graph.

11. A mobile device comprising:
a communication interface; and
a processing unit to:
receive one or more data files via said communication interface, said one or more data files comprising:
an encoded routability graph corresponding to an indoor environment represented by an encoded map, said encoded routability graph being indicative of a plurality of feasible paths within said indoor environment, said plurality of feasible paths being indicated, at least in part, by junctions selectively interconnected by edges, and
a plurality of values indicative of likelihoods of transition for said edges, at least one of said junctions being connected to three or more of said edges, wherein said values indicative of likelihoods of transition are based, at least in part, on one or more features of said encoded map, a number of predetermined possible origination paths in said encoded routability graph leading to said at least one of said junctions, and a number of predetermined possible destination paths that lead away from said at least one of said junctions; and determine an estimated position of said mobile device or an estimated direction of travel of said mobile device, or a combination thereof, based, at least in part, on at least one of said plurality of values indicative of likelihoods of transition and said encoded routability graph.

12. The mobile device of claim 11, wherein said values indicative of likelihoods of transition are based, at least in part, on, a ratio indicative of:
said number of predetermined possible destination paths leading away from said at least one of said junctions; and
said number of predetermined possible origination paths leading toward said at least one of said junctions.

13. The mobile device of claim 11, wherein said number of predetermined possible origination paths and said number of predetermined possible destination paths are based, at least in part, on one or more points of interest in said encoded map.

14. The mobile device of claim 11, wherein at least one of said number of predetermined possible origination paths is based, at least in part, on an all-pairs shortest path (APSP) algorithm applied to said encoded routability graph.

15. The mobile device of claim 11, said processing unit to further:
affect a particle filter based, at least in part, on said at least one of said plurality of values indicative of likelihoods of transition.

16. An article for use in a mobile device, the article comprising:
a non-transitory computer-readable medium having stored therein computer implementable instructions executable by a processing unit to:
receive one or more data files, said one or more data files comprising:
an encoded routability graph corresponding to an indoor environment represented by an encoded map, said encoded routability graph being indicative of a plurality of feasible paths within said indoor environment, said plurality of feasible paths being indicated, at least in part, by junctions selectively interconnected by edges, and
a plurality of values indicative of likelihoods of transition for said edges, at least one of said junctions being connected to three or more of said edges, wherein said values indicative of likelihoods of transition are based, at least in part, on one or more features of said encoded map, a number of predetermined possible origination paths in said encoded routability graph leading to said at least one of said junctions, and a number of predetermined possible destination paths that lead away from said at least one of said junctions; and
determine an estimated position of said mobile device or an estimated direction of travel of said mobile device, or a combination thereof, based, at least in part, on at least one of said plurality of values indicative of likelihoods of transition and said encoded routability graph.

17. The article of claim 16, wherein said values indicative of likelihoods of transition are based, at least in part, on, a ratio indicative of: said number of predetermined possible destination paths leading away from said at least one of said junctions; and said number of predetermined possible origination paths leading toward said at least one of said junctions.

18. The article of claim 16, wherein said number of predetermined possible origination paths and said number of predetermined possible destination paths are based, at least in part, on one or more points of interest in said encoded map.

19. The article of claim 16, wherein at least one of said number of predetermined possible origination paths is based, at least in part, on an all-pairs shortest path (APSP) algorithm applied to said encoded routability graph.

20. The article of claim 16, said computer implementable instructions being further executable by said processing unit to:
affect a particle filter based, at least in part, on said at least one of said plurality of values indicative of likelihoods of transition.

* * * * *